United States Patent [19]

Pinschmidt, Jr. et al.

[11] Patent Number: 5,324,787
[45] Date of Patent: Jun. 28, 1994

[54] MODIFICATION OF POLY (VINYLAMINE)

[75] Inventors: Robert K. Pinschmidt, Jr., Allentown; John G. Smigo, Macungie; Andrew F. Nordquist, Whitehall, all of Pa.

[73] Assignee: Air Products and Chemicals, Inc., Allentown, Pa.

[21] Appl. No.: 977,973

[22] Filed: Nov. 18, 1992

[51] Int. Cl.$^5$ ................................................ C08F 8/00
[52] U.S. Cl. .............................. 515/328.2; 525/328.4; 525/385
[58] Field of Search ........................... 525/328.2, 328.4

[56] References Cited

U.S. PATENT DOCUMENTS

| | | | |
|---|---|---|---|
| 4,217,214 | 8/1980 | Dubin | 210/52 |
| 4,238,579 | 12/1980 | Leonard, Jr. et al. | 525/330 |
| 4,260,714 | 4/1981 | Wingard, Jr. et al. | 526/271 |
| 4,421,602 | 12/1983 | Brunnmueller et al. | 162/168.2 |
| 4,778,725 | 10/1988 | Serizawa et al. | 428/418 |
| 4,952,656 | 8/1990 | Ta-Wang Lai et al. | 525/328.2 |
| 4,978,427 | 12/1990 | Pfohl et al. | 162/168.2 |
| 5,086,111 | 2/1992 | Pinschmidt, Jr. et al. | 525/61 |

FOREIGN PATENT DOCUMENTS 0331047  9/1989  European Pat. Off. .

OTHER PUBLICATIONS

Takemura, Kobunshi Kagaku, 26(288), pp. 306-310 (1969).

Primary Examiner—Bernard Lipman
Attorney, Agent, or Firm—Mark L. Rodgers; William F. Marsh

[57] ABSTRACT

Poly(vinylamine) homopolymers and copolymers are hydrophobically modified by reaction of amine units present in the polymer with a saturated aliphatic or aromatic glycidyl ether compound. The resulting polymers are useful as flocculants in separating water from suspended solids and are especially effective in improving fines retention in papermaking. Poly(vinylamine hydrochloride) modified in this manner with butyl glycidyl ether is shown to be very efficient in retaining the paper product fines present in recycle paper pulps.

10 Claims, No Drawings

MODIFICATION OF POLY (VINYLAMINE)

FIELD OF THE INVENTION

This invention relates to poly(vinylamine)s which have been modified with respect to their hydrophobic character. In another aspect it relates to a method of modifying such polymers by reacting amine units present with glycidyl ethers. In still another aspect it relates to a papermaking process in which a hydrophobically modified poly(vinylamine) is added to improve fines retention.

BACKGROUND OF THE INVENTION

Amine functional polymers are of growing commercial interest because of their versatility in being tailored for specific uses. The amine functionality of these polymers enables them to interact chemically so as to enhance their performance in certain applications. For example, amine functional polymers have been found useful as crosslinking agents for epoxy resins and polyurethanes, in enhanced oil recovery, as flocculants in processes such as wastewater treatment, and in papermaking as wet-end additives to improve paper wet strength.

It is known that the amine functionality in polymers can react with epoxy compositions in a curing process. U.S. Pat. Nos. 4,238,579, Leonard, Jr. et al. (1980) and 4,260,714, Wingard, Jr. et al. (1981) disclose that certain vinylamine copolymers can be used to cure epoxy resins in the manufacture of adhesives, potting resins, self-supporting reinforced composites and the like. Also, U.S. Pat. No. 4,778,725, Serizawa et al. (1988) describes making polymers having side chains containing terminal allyl groups by reacting a poly(vinylamine) with an allyl compound containing an epoxy group. The purpose of adding these side chains is to use the crosslinking properties of these unsaturated groups in the formation of self-supporting films and coated substrates. Ikemura, *Kobunshi Kagaku*, 26(288), pp 306–10 (1969) describes synthesizing polymers by graft copolymerization of ethylene oxide or propylene oxide onto poly(vinylamine). The result is said to be increased water solubility of the poly(vinylamine).

One of the more promising markets for vinylamine polymers takes advantage of the flocculating properties of these materials in operatons which require separation of water from suspended solids. Use of high molecular weight poly(vinylamine hydrochloride) as a flocculating agent is disclosed by U.S. Pat. No. 4,217,214, Dubin (1980). U.S. Pat. No. 4,421,602, Brunnmueller, et al. (1983) describes partially hydrolyzed homopolymers of N-vinylformamide as being useful as retention agents, drainage aids and flocculants in papermaking. European Patent Application 0,331,047 (1989) notes the utility of high molecular weight poly(vinylamine) as a wet-end additive in papermaking for improving dry strength of the product and as a filler retention aid.

U.S. Pat. No. 4,952,656, Lai et al. (1990) describes high molecular weight vinylamine homopolymers which can be made by inverse emulsion polymerization of N-vinylamides such as N-vinylformamide. Use as wet-end papermaking additives is among several utilities mentioned. Also, U.S. Pat. No. 4,978,427, Pfohl et al. (1990) discloses hydrolyzed copolymers of N-vinyl-formamide and ethylenically unsaturated monomers, such as vinyl acetate, which can be used in papermaking to increase product wet strength by addition of the copolymer to the pulp stock suspension in amounts of 0.1 to 5 weight percent based upon the dry fiber.

Market demand for tailored additives has stimulated further interest im modification of vinylamine polymers to increase their usefulness in specific applications. This has been done to increase their hydrophobic character, for example, by reaction with monoaldehydes. U.S. Pat. No. 5,086,111, Pinschmidt, Jr., et al. (1992) describes polyvinyl acetals containing amine functionality made by reacting a monoaldehyde and a poly(vinylamine) which includes both vinylamine homopolymers and copolymers containing ester and/or hydroxy groups. Such poly(vinylamines) have weight average molecular weights from 10,000 to 7 million. These polyvinyl acetals are shown to be useful as floculating agents.

It remains highly desirable to find ways to modify vinylamine polymers in order to change their hydrophobic character or alter other properties to increase their effectiveness in specific applications. One such application is in the retention of fines in papermaking processes. This is particularly a problem when dealing with recycled pulps because of the higher fines levels. Loss of fines during dewatering typically results in poorer physical properties of the finished product as well as reducing yield. This also causes higher fines levels in the processing water leading to costlier and more frequent clean-up.

At present, several types of polymers are being used in various ways to improve fines retention in papermaking. Polymer types used include cationic polymers such as copolymers of acrylamides and quaternary amines, anionic polymers such as copolymers of acrylamide and acrylic acid, and amphoteric polymers such as a polymer of a quaternary amine and acrylic acid. A common method for retaining these fine particles is first to add alum which negates the repulsive forces between the negatively charged cellulosic surface of the fiber and the negatively charged filler particles. Then a cationic polymer is added which bridges the two types of anionic surfaces and binds them together. Several newer systems now being used in this service include blends of cationic polyacrylamides with anionic fillers such as kaolin clays. Another type of blend is a cationic starch with anionic colloidal silica. Despite the wide variety of retention aids available, there continues to be a need for even better fines retention agents as the use of recycled papers continues to grow.

SUMMARY OF THE INVENTION

We have found a convenient way of modifying vinylamine polymers to increase their hydrophobicity by reacting at least a portion of the amine units present with certain glycidyl ethers. The adduct thus formed is a new product exhibiting different properties as a result of added functionality and chain length. The polymer is a poly(vinylamine) which can be either a homopolymer or a copolymer of vinylamine units and other monomers. The glycidyl ether is a compound having the formula:

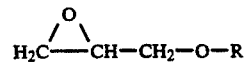

wherein R is a saturated aliphatic or aromatic group containing 1 to 18 carbon atoms.

The thus modified vinylamine polymer is more hydrophobic than the unmodified polymer and is surprisingly effective as a fines retention agent in papermaking, particularly for recycled pulps. Our invention, therefore, includes the use of these polymers in papermaking.

DETAILED DESCRIPTION OF THE INVENTION

The hydrophobically modified polymers of this invention contain the polymeric chain of a poly(vinylamine) which can be either a homopolymer or copolymer based upon vinylamine. It should be understood that the term "poly(vinylamine)" as used to describe our invention defines a class of polymers having an ethylenic backbone and amine functionality along the polymer chain. Since vinylamine does not exist as a stable monomer, the polymer is formed through intermediates, such as by the polymerization of vinylamides and hydrolysis of the amide functionality to amine. The product of such hydrolysis in an acidic medium is frequently the hydrochloride salt form of the polymer. In general, the polymer which is modified according to this invention can be in the salt or salt-free form.

Preferably the base polymer is a vinylamine homopolymer obtained by hydrolysis of polymerized vinylamide, such as N-vinylformamide (NVF). The preparation of such polymers is well known and described in the background prior art given above. Hydrolysis of the poly NVF is not normally 100 percent complete so that even the homopolymer contains about 5 mol percent or so of unhydrolyzed amide units. These residual amide units do not, however, adversely affect the modification of the polymer with the glycidyl ether. In fact, it is within the scope of the invention to use a partially hydrolyzed poly(vinylamide) as the base polymer. The preferred product of hydrolysis is, however, a poly(vinylamine hydrochloride).

Other monomers which can be copolymerized with a vinylamide to prepare the base polymer include vinyl acetate, acrylamide, acrylic acid, (meth)acrylic esters, diallyl dimethylammonium chloride (DADMAC), acrylamidomethylpropane sulfonic acid (AMPS), sodium vinyl sulfonate (SVS), and the like. Hydrolysis of vinyl acetate copolymers gives vinyl alcohol functionality. Copolymers containing copolymerized allyl and diallylamine can also be used. Up to 50 mol percent of the vinylamine copolymer can be made up of such comonomer units provided the polymer formed is water soluble. In fact, in the case of copolymers of vinylamides and vinyl acetate, which hydrolyze to form amine and hydroxy functionality, the proportion of comonomer can be even greater. Even the modified homopolymer can be considered to be the structural equivalent of a copolymer of vinyl amine and N-vinyl-1-(2-hydroxy-3-alkoxy)propylamine when the R group of glycidyl ether formula is alkyl. This is so because not all the amine units are reacted with the glycidyl ether, but remain, in the preferred polymer product, as a distinctive monomer unit, namely vinyl amine. Some fraction of the epoxide is expected to react in the opposite sense to give N-vinyl-2-(1-hydroxy-3-alkoxy)propylamine.

The base polymer which is modified with the glycidyl ether can be prepared by the methods known in the art to produce flocculating polymers useful in wastewater treating and papermaking. These polymers cover a very broad molecular weight range from about 10,000 to 7 million weight average molecular weight. Preferably the polymers used in this invention have molecular weights from about 50,000 to 5 million.

The glycidyl ethers which can be used for the modification of the base poly(vinylamine) are saturated aliphatic glycidyl ethers such as epoxide 7 (containing $C_8$ ethers), epoxide 8 (containing $C_{12}$ and $C_{14}$ ethers) or aromatic glycidyl ethers such as phenyl glycidyl ether, cresyl glycidyl ether, and the like. The alkyl glycidyl ethers, such as butyl glycidyl ether, are preferred. In general these ethers have the structural formula:

wherein R is a saturated aliphatic or aromatic group containing 1 to 18 carbon atoms. The R group can be alkyl, cycloalkyl, aryl, alkaryl or aralkyl, and can be straight chains or branched. Preferred are the alkyl glycidyl ethers in which the alkyl group contains 4 to 12 carbon atoms.

The level of alkoxylation of the amine units can be as low as 0.1 mol percent up to the theoretical maximum of 200 mol percent where both hydrogen atoms of the amine units have been replaced by epoxy addition. Best results for use in papermaking can be achieved, however, when the level of alkoxylation is controlled relative to the size of the R group in the molecule, referring to the above formula. For example, when the R group contains 1 to 6 carbons the alkoxylation of amine units should be about 5 to 80, preferably 5 to 50 mol percent. When the R group contains 7 to 12 carbon atoms the level should be about 2 to 25, preferably 2 to 10 mol percent. And when the R group contains 13 to 18 carbons the epoxidation level should be 0.1 to 5, preferably 0.3 to 2 mol percent. It should be understood that these proportions are given as guides to obtaining optimum results and should not be construed as limiting our invention. We prefer to use glycidyl ethers in which the R group contains 4 to 12 carbons. The level of epoxidation is based upon achieving hydrophobic modification and normally depends upon the hydrophobicity of the glycidyl ether.

The modified polymers of this invention are useful as additives in operations where water must be separated from suspended solids, as, for example, in wastewater treatment and in papermaking. The polymers are effective flocculants but, more importantly, provide exceptional benefits in the retention in the formed sheet of fines from a paper pulp slurry. As a general utility flocculant the level of addition is the same as given for amine functional polymers in the prior art, for example, about 0.1 to 5 weight percent polymer based on the dry solids. When used as a fines retention agent in papermaking, the level of addition depends upon the amount of fines in the pulp. Generally, the fines levels are higher in paper pulps derived from recycled paper, and this varies with the nature of the paper, such as kraft, newsprint, or other paper type. We prefer to use 0.01 to 1 weight percent polymer based on dry polymer and total fines. Fines is considered to be any material, cellulosic or not, 76 microns and smaller in the pulp. Data show efficient fines retention in the formed sheet when using 0.02 to 0.5 weight percent polymer based on the fines. Conveniently the polymer is first dissolved in water and the aqueous solution is then added to the pulp slurry to provide the desired polymer dosage level.

Good fines retention in papermaking is important because it helps to achieve higher quality and more consistent results in the final paper product. Also, fines retention enables more efficient and cost effective use of the pulp stock since less cellulosic fiber is in the final product. An additional benefit is cleaner process water. The modified polymer of this invention exhibits an excellent ability to flocculate and retain, in the formed sheet, a high percentage of the numerous types of fine particles present in recycled pulps. Also, the polymer displays effective fines retention under both acidic and alkaline papermaking conditions.

In comparison with the aldehyde modified polymer described in U.S. Pat. No. 5,086,111, the epoxide modified polymer of this invention is chemically more resistant to hydrolysis, particularly under acidic conditions. While not to be bound by theory, it is believed that the epoxide modified polymers are so effective because the hydrophobic regions of one polymer chain can associate with hydrophobes on other chains, forming bridging micelles and effectively increasing molecular weight of the operative polymer. Heavier polymers are typically better flocculants. Also, it is believed that the presence of hydrophobic ether groups decreases the concentration of the cationic charge on the polymer. There is consequently sufficient charge to neutralize the surface charge on the fines, without imparting a net positive charge which would redisperse the fines.

Other advantages and features of our invention will be apparent to those skilled in the art from the following examples which are illustrative only and should not be construed to limit our invention unduly.

EXAMPLE I

Preparation of poly(vinylamine hydrochloride)

A one liter glass reactor was charged with 120.1 grams (1.692 moles) of N-vinylformamide, 480 grams of deionized water, and 0.834 grams (0.00308 moles) of Mixxim I-100 (2,2'-azobis(2-amidinopropane) dihydrochloride). After purging the mix with a nitrogen dip tube for 75 minutes at room temperature, the reactor was sealed under nitrogen, stirred at 200 RPM, and held at 20° C. for 60 minutes. The temperature was ramped to 55° C. over 15 minutes, held there for 5 hours, 20 minutes, and ramped down to 30° C. over 30 minutes.

The polymer was hydrolyzed by adding 140 grams of 50 weight percent sodium hydroxide and 100 mL of deionized water, ramping to 80° C. over 55 minutes and holding at 80° C. for 8 hours. After cooling, 422 mL of concentrated hydrochloric acid was slowly added to the hydrolyzate, precipitating the poly(vinylamine hydrochloride) as a tacky mass. The polymer was soaked in three 500 mL volumes of isopropanol, for a total of 24 hours, and air dried. The dried polymer was milled to approximately 40 mesh, soaked in 800 mL of isopropanol for 3 days, filtered and dried at 60° C. and 250 torr, yielding 126.9 grams. (Analysis: 2.8% isopropanol, 2.8% water, 2.0% ash at 950° C., number average molecular weight=143,000, weight average molecular weight=510,000).

EXAMPLE II

Forming butyl glycidyl ether derivative

A round bottom flask equiped with a reflux condenser was charged with a solution of 7.95 grams (0.100 moles) of poly(vinylamine hydrochloride), 38.0 grams of methanol, 3.46 grams of sodium hydroxide and 75.7 grams of water. The pH was adjusted to 9.0 with approximately 4 mL of concentrated hydrochloric acid. With the mixture at 20° C., 2.99 grams (0.02 moles) of butyl glycidyl ether was added over 5 minutes. The reaction was heated to 80° C. and held there for 3.5 hours. After cooling, the polymer was precipitated by addition of 21 mL of concentrated hydrochloric acid, washed with isopropanol, and dried at 60° C. and 250 torr. Based on $C^{13}$ NMR, 0.161 moles of butyl glycidyl ether were incorporated per mole of nitrogen in the polymer for a 16.1 mol percent addition rate.

EXAMPLE III fines retention in papermaking

A slurry was prepared using recycled newsprint, clay, alum and water. The pH of the slurry was adjusted to 5.5. The slurry was then tested for consistency, total fines and fines retention using a Britt Jar and TAPPI test method 261 according to the following steps:

1. The percent consistency was determined by vacuum filtration of 100 mls of slurry. Material was then dried and weighed. The exact consistency was then calculated according to the formula:

(1) % consistency=(dry weight/initial weight)×100.

2. Total fines of the slurry was then determined. Five hundred mls of the slurry was placed in the Britt Jar apparatus containing a 125P screen (76 micron). The agitator was run at 750 RPM. The bottom orifice was opened and completely drained into a catch beaker. Five hundred mls of wash water (solution of water containing 0.01% Tamol 850 (a water soluble acrylic polymer containing sodium carboxylate groups, available from Rohm and Haas Co.), 0.01% sodium carbonate and 0.1% sodium tripolyphosphate), was added to the Britt Jar and again agitated at 750 RPM. The bottom orifice was again opened to completely drain to a catch beaker. This procedure was continued until a clear filtrate was observed. At this point, 500 mls of the wash water was added to the material remaining on the screen. This was transferred to a weighed filter paper, dried, then reweighed and the total fines was calculated according to the formulas:

(2). (initial weight×consistency)=solids (3). (1-[dried weight/solids])=total fines.

3. A blank % fines retention was determined for the slurry. Five hundred mls of the slurry was weighed. To this was added 100 mls of wash water. The whole mixture was then put into the Britt Jar and agitated for one minute at 750 RPM. The bottom orifice was then opened and material was drained into a clean, preweighed beaker for 30 seconds. The beaker with filtrate was then weighed and vacuum filtered on preweighed filter paper. The filter paper was then dried and reweighed. The percent fines retention was calculated according to the formulas:

(4). (initial weight×consistency×total fines)=total fines in blank (5). ([filtrate weight/initial weight]×total fines in blank)=fines in filtrate (6). 1-(dried weight/fines in filtrate)×100=% fines retention.

4. Polymers were tested by adding the desired dosage of polymer to the 500 mls of slurry and proceeding with step 3 as given above. The results are reported as a % fines retention improvement over the blank % fines retention.

In this Example, polymer was added at varying dosage levels from 0.025% to 0.20% (dry polymer based on total fines). The polymers tested were the epoxide modified poly(vinlyamine) hydrochloride (PVAm. HCl) of Example II, the unmodified polymer of Example I, and two commercial papermaking flocculating agents, Betz CDP-713 and Magnafloc 496C. The percent fines retention was calculated for each polymer and dosage level. The percent fines retention improvement over the untreated pulp sample was then calculated and is reported in Table 1.

TABLE 1

| PERCENT FINES RETENTION IMPROVEMENT | | |
|---|---|---|
| | Dosage Level | |
| Retention Agent | 0.025% | 0.20% |
| Modified PVAm.HCl | 3.3 | 14.9 |
| PVAm.HCl | −2.2 | 0.3 |
| Betz CDP-713 | −6.1 | −1.5 |
| Magnafloc 496C | 0.2 | 1.8 |

As shown by the data of Table 1, the epoxide modified poly(vinylamine hydrochloride) of this invention is several fold more effective as a fines retention agent for recycled newsprint than the commercial products or the unmodified poly(vinylamine). The polymer of the invention provided a significant improvement in fines retention at the low level of 0.025% where the other additives were ineffective. At the higher dosage level of 0.20%, which is within the dosage range given in the Pfohl et al. patent for a papermaking additive, the polymer of the invention is over eight times more effective than the Magnafloc 496, the better of the two commercial products tested.

Other embodiments of our invention will be apparent to those skilled in the art from the foregoing disclosure without departing from the spirit or scope of the invention.

We claim:

1. A poly(vinylamine) modified by reaction with alkyl glycidyl ether.

2. A polymer having the structure corresponding to that of a copolymer of vinylamine and N-vinyl-1-(2-hydroxy-3-alkoxy)propylamine.

3. A vinylamine-containing polymer which has been modified such that at least 0.1 mol percent of the amine units have been reacted with a glycidyl ether compound having the formula:

wherein R is a saturated aliphatic or aromatic group containing 1 to 18 carbon atoms.

4. The vinylamine-containing polymer of claim 3 which has a weight average molecular weight of 10,000 to 7 million.

5. The polymer of claim 4 wherein said is a vinylamine-containing polymer.

6. The polymer of claim 5 wherein said N-vinylamide is N-vinylformamide vinylformamide and said vinyl ester is vinyl acetate.

7. The polymer of claim 2 having the structure corresponding to that of a copolymer of vinyl amine and N-vinyl-1-(2-hydroxy-3-butoxy)propylamine.

8. The polymer of claim 3 wherein said vinylamine-containing polymer is poly(vinylamine).

9. The polymer of claim 8 wherein said poly(vinylamine) is a hydrolyzed homopolymer of an N-vinylamide.

10. The polymer of claim 9 wherein said N-vinylamide is N-vinylformamide.

UNITED STATES PATENT AND TRADEMARK OFFICE
CERTIFICATE OF CORRECTION

PATENT NO. : 5,324,787

DATED : June 28, 1994

INVENTOR(S) : R. K. Pinschmidt, Jr., et al

It is certified that error appears in the above-identified patent and that said Letters Patent is hereby corrected as shown below:

In column 8, lines 23 and 24, claim 5 should read as follows:

-- The polymer of claim 4 wherein said vinylamine-containing polymer is a hydrolyzed copolymer of an N-vinylamide and a vinyl ester.--.

Signed and Sealed this

Twentieth Day of September, 1994

Attest:

BRUCE LEHMAN

*Attesting Officer*       *Commissioner of Patents and Trademarks*